(12) United States Patent
Kim et al.

(10) Patent No.: US 9,893,608 B2
(45) Date of Patent: Feb. 13, 2018

(54) POWER SUPPLY DEVICE

(71) Applicant: LG INNOTEK CO., LTD., Seoul (KR)

(72) Inventors: Dong Gyun Kim, Seoul (KR); Dong Young Huh, Seoul (KR); Jae Sam Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/913,473

(22) PCT Filed: Aug. 12, 2014

(86) PCT No.: PCT/KR2014/007501
§ 371 (c)(1),
(2) Date: Feb. 22, 2016

(87) PCT Pub. No.: WO2015/026096
PCT Pub. Date: Feb. 26, 2015

(65) Prior Publication Data
US 2016/0204694 A1     Jul. 14, 2016

(30) Foreign Application Priority Data

Aug. 22, 2013   (KR) ........................ 10-2013-0099591

(51) Int. Cl.
*G05F 1/00*        (2006.01)
*G05F 1/613*      (2006.01)
(Continued)

(52) U.S. Cl.
CPC ....... *H02M 1/4208* (2013.01); *H02M 1/4225* (2013.01); *H02M 7/06* (2013.01);
(Continued)

(58) Field of Classification Search
CPC .......... G05F 1/595; H02M 2003/1552; H02M 3/156
(Continued)

(56) References Cited

U.S. PATENT DOCUMENTS 4,426,589 A * 1/1984 Moder ............. H03K 17/08146
                                                        327/412
5,923,152 A * 7/1999 Guerrera ................... G05F 1/70
                                                        323/222
(Continued)

FOREIGN PATENT DOCUMENTS

KR    10-2013-0008103 A      1/2013

OTHER PUBLICATIONS

International Search Report (with English translation) and Written Opinion dated Dec. 19, 2014 issued in Application No. PCT/KR2014/007501.

*Primary Examiner* — Gary Nash
(74) *Attorney, Agent, or Firm* — KED & Associates, LLP

(57) ABSTRACT

According to one embodiment of the present invention, when a power supply device having first and second amplification units which share an energy storage element is used, it is possible to reduce voltage stress of a semiconductor device and to consistently maintain output voltage outputted to the first and second amplification units while individually adjusting the amplification rates of the first and second amplification units.

16 Claims, 14 Drawing Sheets

(51) Int. Cl.
 *G05F 3/16* (2006.01)
 *G05F 1/618* (2006.01)
 *H01F 17/00* (2006.01)
 *H02M 7/00* (2006.01)
 *H02M 7/538* (2007.01)
 *H02M 1/42* (2007.01)
 *H02M 7/06* (2006.01)
 *H02M 7/217* (2006.01)
 *H02M 7/155* (2006.01)
 *H02M 1/00* (2006.01)

(52) U.S. Cl.
 CPC ........... *H02M 7/155* (2013.01); *H02M 7/217* (2013.01); *H02M 2001/009* (2013.01); *Y02B 70/126* (2013.01)

(58) Field of Classification Search
 USPC ......... 323/222–226, 363; 363/124, 131–136, 363/139
 See application file for complete search history.

(56) References Cited

U.S. PATENT DOCUMENTS

| | | | |
|---|---|---|---|
| 5,946,208 A * | 8/1999 | Yamamoto | A61B 6/488 363/132 |
| 8,026,697 B2 | 9/2011 | Yang | |
| 2004/0201281 A1 | 10/2004 | Ma et al. | |
| 2006/0170288 A1 | 8/2006 | Usui | |
| 2009/0039711 A1 | 2/2009 | Williams | |
| 2010/0046251 A1 | 2/2010 | Kyono | |
| 2010/0097045 A1 | 4/2010 | Chen | |
| 2013/0313996 A1* | 11/2013 | Williams | H02M 3/158 315/291 |

* cited by examiner

POWER SUPPLY DEVICE

CROSS-REFERENCE TO RELATED PATENT APPLICATIONS

This application is a U.S. National Stage Application under 35 U.S.C. §371 of PCT Application No. PCT/KR2014/007501, filed Aug. 12, 2014, which claims priority to Korean Patent Application No. 10-2013-0099591, filed Aug. 22, 2013, whose entire disclosures are hereby incorporated by reference.

TECHNICAL FIELD

The embodiment relates to a power supply device.

BACKGROUND ART

In general, most switching power supplies used as power supplies of electronic equipment have employed capacitor input type rectifier circuits. Since a pulse-type input current is generated due to the capacitor and pulse-type input currents are simultaneously generated at the inputs of electronic, information and communication equipment, the pulse-type input current is provided to a power distribution line so that a harmonic distortion occurs in a power supply system and the power factor of a commercial power source is decreased.

To solve the problems, studies for a boost-type PFC (Power Factor Correction) control circuit having a function of correcting a power factor have been actively performed.

FIG. 1 is a view illustrating a boost converter type power supply device according to the related art.

Referring to FIG. 1, a power supply device 1 according to the related art includes a rectifier 2 having both terminals connected to an input power source, an inductor 3 connected between the rectifier 2 and a switching device 4 as an energy storage device, a diode connected between the switching device 4 and a capacitor.

The power source device 1 amplifies a voltage of an input side at a ratio to output an amplified voltage.

In 3-phase power system, when a high voltage such as a line voltage is applied to the power source device 1, a very high voltage is applied to an output end 5. Thus, since a voltage stress of a semiconductor device in the output end is increased, as a switching device, an IGBT (Insulated Gate Bipolar Transistor) device is used rather than a FET (Field Effect Transistor) device. Accordingly, there is a drawback that a low-frequency frequency must be used for the IGBT device. In addition, there are limitations in designing a power source device due to increases in the size and costs of a passive device.

DISCLOSURE

Technical Problem

The embodiment provides a power supply device capable of reducing voltage stress of a semiconductor device in the power supply device.

The embodiment provides a power supply device capable of constantly controlling the output voltages of first and second output units in the power supply device.

Technical Solution

According to an embodiment, there is provided a power supply device which includes: an input power source unit to rectify AC power to output a first voltage; an amplifying unit to amplify the first voltage received from the input power source unit and divide the amplified voltage into second and third voltages; and a control unit to control the amplifying unit such that the second and third voltages have values equal to each other.

The amplifying unit includes an inductor, and first and second amplifying units connected to both terminals of the inductor.

The second voltage is output from the first amplifying unit, and the third voltage is output from the second amplifying unit.

The first amplifying unit outputs the second voltage according to an operation of a first switching device, and the second amplifying unit outputs the third voltage according to an operation of a second switching device.

The control unit includes a voltage controller which compares output signals of the first and second amplifying units with a first reference voltage to output a first control signal.

The control unit further includes a power factor improving circuit unit which receives the first control signal and outputs a compensation value to control a phase difference between a voltage and a current of the input power source unit.

The power factor improving circuit unit is controlled according to the first control signal, the first voltage and a current flowing through the inductor.

The control unit further includes a fine displacement control unit which compares the second and third voltages with second and third reference voltages, respectively, and outputs a fine displacement signal.

The power supply device further includes a comparator to compare a compensation value of the power factor circuit unit, the fine displacement signal and a triangular wave signal with one another to control the first and second switching devices.

The fine displacement control unit includes first and second fine displacement control units, the first fine displacement control unit compares the second voltage of the first amplifying unit with the second reference voltage to output a first fine displacement signal, and the second fine displacement control unit compares the third voltage of the second amplifying unit with the third reference voltage to output a second fine displacement signal.

The comparator includes first and second comparators, the first comparator compares a first comparison signal, which is a sum of the compensation value of the power factor circuit unit and the first fine displacement signal, with the triangular wave signal to output a first PWM signal, and the second comparator compares a second comparison signal, which is a sum of the compensation value of the power factor circuit unit and the second fine displacement signal, with the triangular wave signal to output a second PWM signal.

The first PWM signal controls the first switching device, and the second PWM signal controls the second switching device.

The first comparison signal is applied to a non-inverting terminal of the first comparator, the triangular wave signal is applied to an inverting terminal of the first comparator, the second comparison signal is applied to a non-inverting terminal of the second comparator, and the triangular wave signal is applied to an inverting terminal of the second comparator.

The second reference voltage has a value equal to a value of the third reference voltage.

A sum of the second and third reference voltages is equal to the first reference voltage.

The first and second fine displacement control units are configured as an operating amplifier.

The first and second fine displacement control units include a negative feedback having a resistor and a capacitor connected in series with the resistor.

The power supply device further includes a rectifier to rectify AC power to output a first voltage; a first amplifying unit to amplify the first voltage to output a second voltage; a second amplifying unit to amplify the first voltage to output a third voltage; an inductor connected in series between the first and second amplifiers; and a control unit to control the first and second amplifying units to maintain the second and third voltages to be equal to each other, wherein the first amplifying unit includes a first switching device and a first output unit connected in parallel to the first switching device, the second amplifying unit includes a second switching device and a second output unit connected in parallel to the second switching device, the control unit controls the first and second switching devices to be operated in first and second operating modes, the first and second switching devices are simultaneously turned on and off in the first operating mode, and the first switching device is turned off at a first time point and the second switching device is turned off at a second time point in the second operating mode.

The control unit controls the first and second switching devices to be operated in the second operating mode when the second and third voltages are different from each other.

The first time point follows the second time point.

Advantageous Effects

According to the power supply device of the embodiment, the voltage stress of the semiconductor device may be reduced by using the power supply device which includes the first and second amplifying units sharing the energy storage device with each other. In addition, the output voltages output from the first and second amplifying units may be constantly maintained by individually controlling the amplifying ratios of the first and second amplifying units.

DESCRIPTION OF DRAWINGS

FIG. 4 is a circuit diagram illustrating the operation of a power supply device according to the first embodiment when the first and second switching devices Qs and Qm are turned on.

FIG. 7 is a circuit diagram illustrating the operation of the power supply device according to the first embodiment when the first switching device Qs is turned off and the second switching device Qm is turned on.

BEST MODE

[Mode of the Invention]

Hereinafter, exemplary embodiments will be described in detail with reference to the accompanying drawings. It should be understood that the following embodiments are provided for complete disclosure and thorough understanding of the embodiments by those skilled in the art. Thus, it should be understood that embodiments are not limited to the following embodiments, but can be embodied in different ways.

Figure 1:
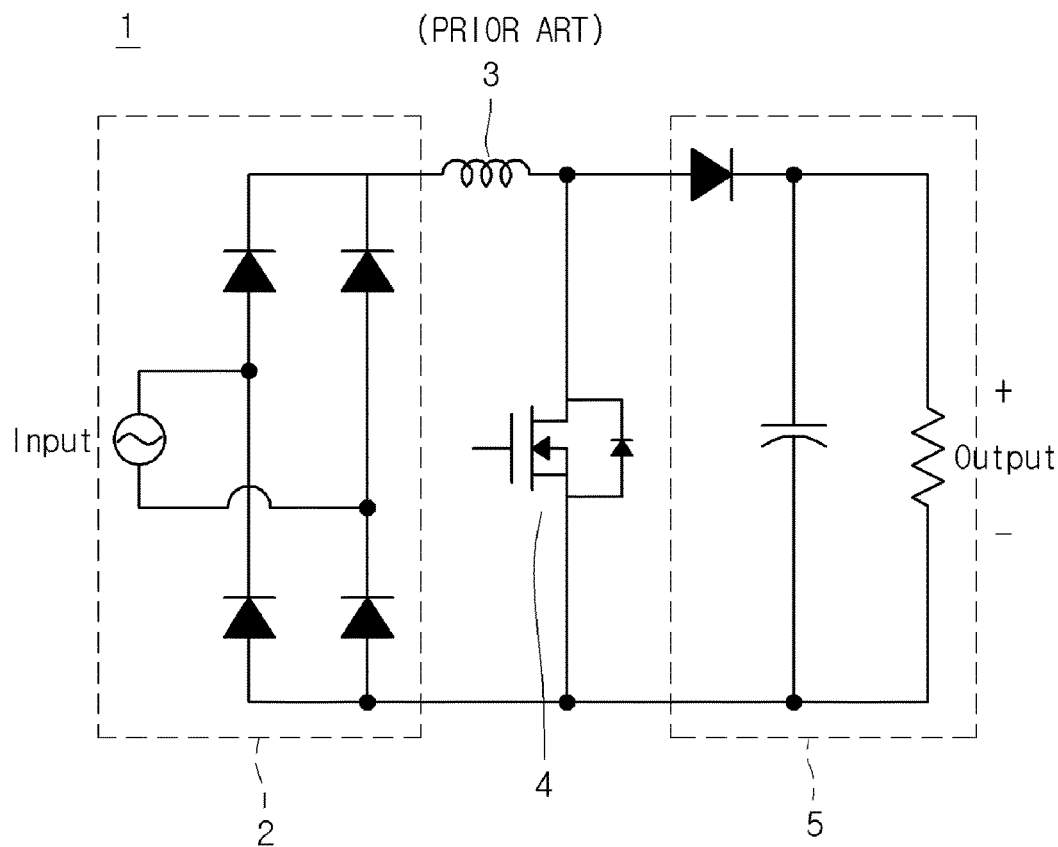
FIG. 1 is a circuit diagram of a boost converter type power supply device according to the related art.
Figure 2:
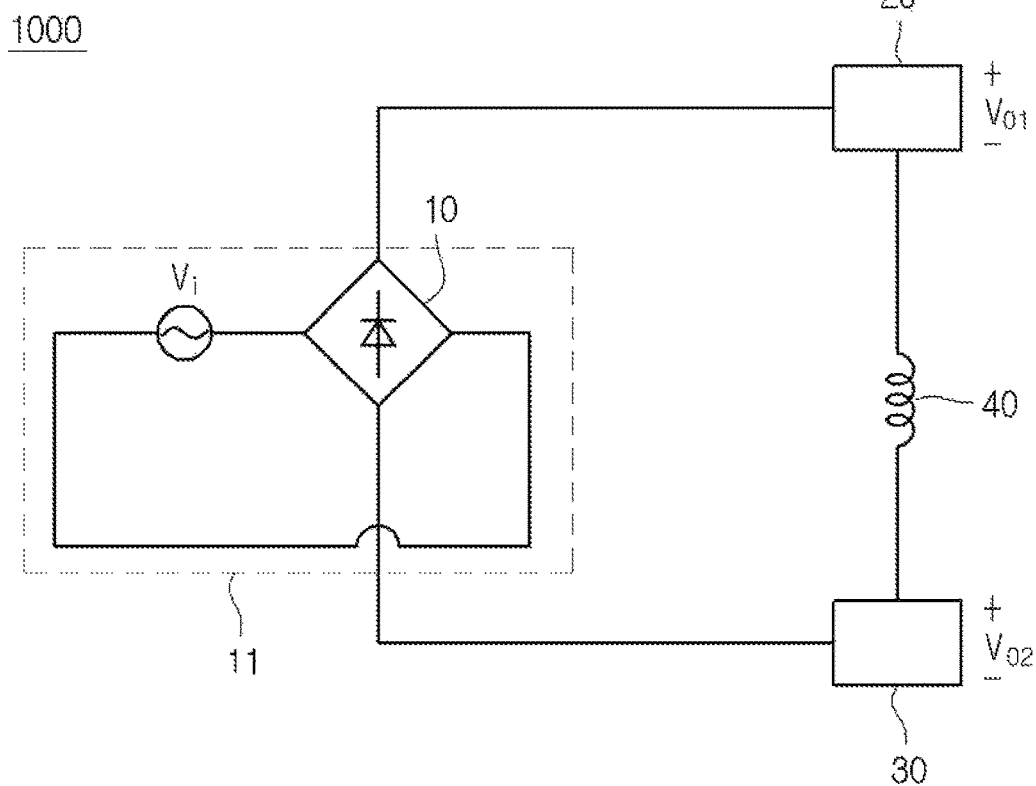
FIG. 2 is a block diagram of a power supply device 1000 according to an embodiment.
Figure 3:
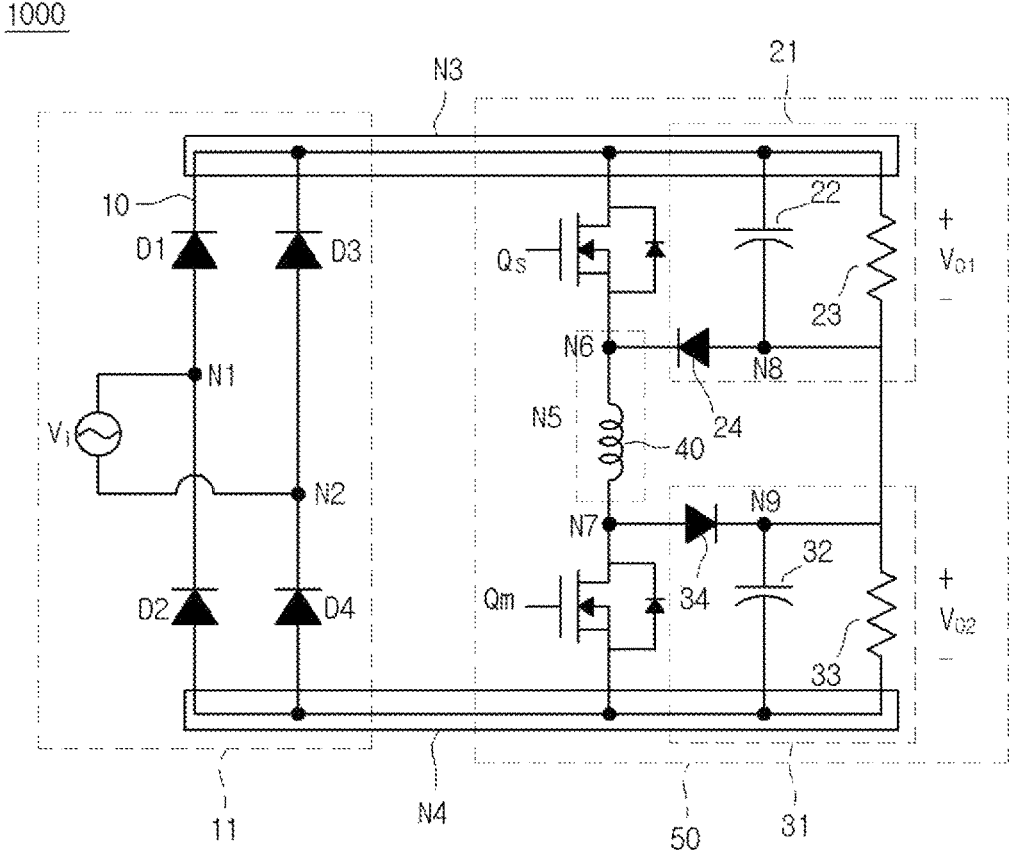
FIG. 3 is a circuit diagram of a power supply device according to an embodiment.

FIG. 2 is a block diagram of a power supply device 1000 according to an embodiment. FIG. 3 is a circuit diagram of the power supply device 1000 according to an embodiment.

The power supply device 1000 according to the embodiment may be used for a system requiring an output voltage higher than an input voltage, that is, the boost of a power voltage.

For example, the power supply device may be used for a solar panel, a rectifier and a DC generating device. In addition, the power supply device may be used as a voltage supply device of an LED (Light Emitting Diode) panel or a device for boosting a gate driving voltage of an LED panel, but the embodiment is not limited thereto.

Referring to FIGS. 2 and 3, the power supply device 1000 according to the embodiment may include a power source unit 11 having a rectifying unit 10, first and second amplifying units 20 and 30 and an inductor 40 serving as an energy storage device.

The rectifying unit 10 rectifies an input AC power to output the rectified power. The rectifying unit 10 may be a bridge rectifier and include first to fourth diodes D1 to D4.

The rectifying unit 10 may receive an input AC power through first and second nodes and rectify the input AC power to output the rectified power to third and fourth nodes.

Hereinafter, the connections between the first to fourth diodes D1 to D4 of the rectifying unit 10 will be described.

Each of the first to fourth diodes D1 to D4 includes an anode connected to the P region and a cathode connected to the N region.

The anode terminal of the first diode D1 is connected to the first node N1 and the cathode terminal is connected to the third node N3.

The anode terminal of the second diode D1 is connected to the fourth node N4 and the cathode terminal is connected to the second node N2.

The anode terminal of the third diode D3 is connected to the second node N2 and the cathode terminal is connected to the third node N3.

The anode terminal of the fourth diode D4 is connected to the fourth node N4 and the cathode terminal is connected to the second node N2.

The inductor 40 serving as an energy storage device and synchronized with the operations of the first and second switching devices Qs and Qm may accumulate energy therein and repeat the operation of supplying the accumulated energy to the first and second amplifying units 20 and 30.

The first and second amplifying units 20 and 30 may be synchronized with the inductor 40 and may amplify the input voltages to output the amplified voltages.

The first and second amplifying units 20 and 30 and the inductor 400 are connected in series to each other. Although the inductor 40 connected between the first and second amplifying units 20 and 30 is depicted in the drawings, the embodiment is not limited thereto.

The inductor 40 and the first and second amplifying units 20 and 30 may be sequentially disposed in the order of the inductor 40, the first amplifying unit 20 and the second amplifying unit 30 or the first amplifying unit 20, the second amplifying unit 30 and the inductor 40.

The first and second amplifying units 20 and 30 may have a circuit configuration shown in FIG. 3.

Hereinafter, the fifth to seventh nodes N5 to N7 are defined as supper nodes.

The first amplifying unit 20 may be connected between the third and fifth nodes N3 and N5.

The second amplifying unit 30 may be connected between the fifth and fourth nodes N5 and N4. Thus, the first and second amplifying units 20 and 30 may be connected in series to each other.

The inductor 40 may be connected between the sixth and seventh nodes N6 and N7.

The position of the inductor 40 is not limited to the above.

The inductor 40 may be connected to the third node N3 between the rectifying unit 10 and the first amplifying unit 20 and the fourth node N4 between the rectifying unit 10 and the second amplifying unit 30. Thus, the rectifying unit 10, the first and second amplifying units 20 and 30 and the inductor 40 may be connected in series to one another.

The first amplifying unit 20 may include a first switching device Qs and a first output unit 21 connected in parallel to the first switching device Qs.

The second amplifying unit 30 may include a second switching device Qm and a second output unit 31 connected in parallel to the second switching device Qm.

The first output unit 21 may include a first capacitor 22, a first resistor 23 and a first output diode 24.

The first capacitor 22 and the first resistor 23 may be connected in parallel to each other and the first output diode 24 may be connected in series to the first capacitor 22 and the first resistor 23.

Although the first output diode 24 connected between the fifth node N5 and the eighth node N8 is depicted in the drawings, the embodiment is not limited thereto and the first output diode 24 may be connected forward to the third node N3 between the first switching device Qs and the first capacitor 22.

The second output unit 31 may include a second capacitor 32, a second resistor 33 and a second output diode 24.

The second capacitor 32 and the second resistor 33 may be connected in parallel to each other and the second output diode 34 may be connected in series to the second capacitor 32 and the second resistor 33.

Although the second output diode 34 connected between the fifth node N5 and the ninth node N9 is depicted in the drawings, the embodiment is not limited thereto.

The second output diode 34 may be connected forward to the fourth node N4 between the second switching device Qm and the second capacitor 32.

Meanwhile, the first and second capacitors 22 and 32 may allow the currents supplied to the first and second resistors 23 and 33 to be stable and the first and second output diodes 24 and 34 may operate as rectifier diodes to prevent reverse currents from flowing therethrough.

The first and second switching devices Qs and Qm control currents supplied from the inductor 40 to the first and second output units 21 and 31.

That is, the first and second switching devices Qs and Qm may repeat switched on or off operations according a pulse width modulation (PWM) signal, such that the intensities of currents supplied from the inductor 40 to the first and second output units 21 and 31 may be controlled.

Although the first and second switching devices Qs and Qm are depicted as power MOSFETs for convenience in the drawings, the embodiment is not limited thereto. Thus, the first and second switching devices Qs and Qm may include devices controllable to be turned on or off according to the power capability.

The power supply device 1000 receives an input voltage. The first output unit 21 may generate a first output voltage Vo1 according to the operation of the first switching device Qs. In addition, the second output unit 31 may generate a second output voltage Vo2 according to the operation of the second switching device Qm.

In other words, the first and second amplifying units 20 and 30 may amplify the input voltage from the input power source unit 11 by n times.

Differently from a buck converter, an output voltage of which is lower than an input voltage, an output voltage of the power supply device 1000 according to the embodiment may be higher than an input voltage thereof. The 'n' may be a real number greater than '1'. In addition, the power supply device 1000 according to the embodiment may have a voltage transfer ratio expressed as following Equation 1.

$$G_v = \frac{V_0}{V_i} = \frac{1}{1-D} \qquad \text{[Equation 1]}$$

Where $V_i$ is an input voltage and $V_o$ is an output voltage of an amplifying unit 50.

The relationship between the voltage transfer ration $G_v$ and a duty ratio D is inversely proportional to (1-D).

When the duty ratio D is '0' (zero), the voltage transfer ratio $G_v$ becomes the minimum value '1'. When the duty ratio D is '1' (zero), the voltage transfer ratio $G_v$ becomes infinity at the minimum.

In case of an ideal device, the output voltage of the amplifying unit 50 may be controlled by varying D in the range of '0' to '1'.

The first amplifying unit 20 may output the first output voltage Vo1, which corresponds to n1 times of the input voltage, to the first output unit 21. In addition, the second amplifying unit 30 may output the second output voltage Vo2, which corresponds to n2 times of the input voltage, to the second output unit 31.

An amplification ratio of the first amplifying unit 20 may be controlled according to a switching frequency of the first switching device Qs and an amplification of the second amplifying unit 30 may be controlled according to the operation of the second switching device Qm.

The relationship between the amplification ratio of the amplifying unit 50 and the amplification ratios of the first and second amplifying units 20 and 30 constituting the amplifying unit 50 satisfies following Equation 2.

$$n = n_1 + n_2 \quad \text{[Equation 2]}$$

That is, the amplifying unit 50 may amplify an input voltage twice. Such an amplified voltage is equal to the sum of the input voltage amplified n1 times by the first amplifying unit 20 and the input voltage amplified n2 times by the second amplifying unit 30.

The 'n1' and 'n2' may be equal to each other or different from each other.

When 'n1' is equal to 'n2', the amplifications of the first and second amplifying units 20 and 30 are equal to each other. Thus, the output voltages equal to each other may be obtained from the first and second output units 21 and 31.

When 'n1' is different from 'n2', the amplifications of the first and second amplifying units 20 and 30 are different from each other. Thus, the mutually different output voltages may be obtained from the first and second output units 21 and 31.

Hereinafter, an operation of the power supply device 1000 according to the first embodiment will be described with reference to FIGS. 4 to 7. However, in the following description, for the purpose of convenient description, it will be assumed that the devices have approximately ideal characteristics.

The first and second switching devices Qs and Qm may be operated in four operating modes, that is, in the first to fourth operating modes.

The output voltages of the first and second output units 21 and 31 may be controlled according to whether the first and second switching device Qs and Qm are switched on or off.

[First Operating Mode]

Figure 4:
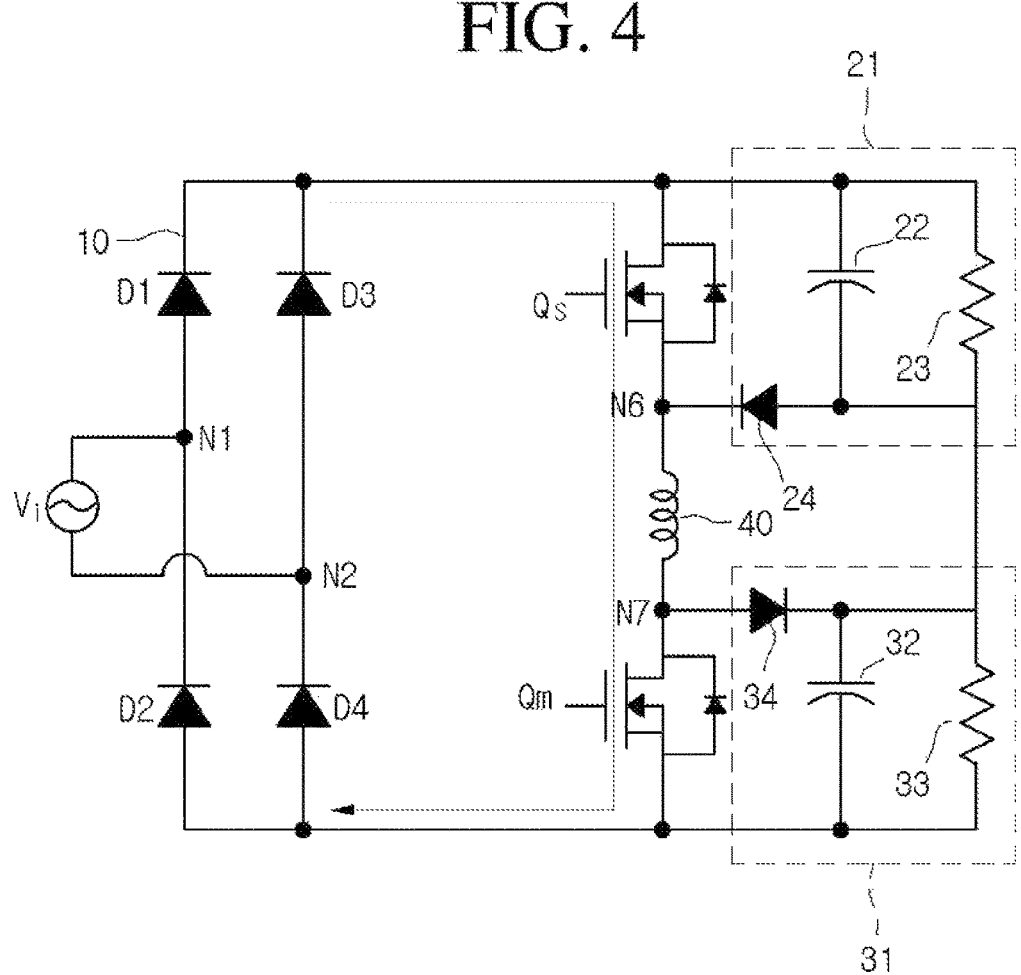

FIG. 4 is a circuit diagram illustrating the operation of the power supply device 1000 according to the first embodiment when all the first and second switching devices Qs and Qm are turned on.

Referring to FIG. 4, in the first operating mode, the first and second switching devices Qs and Qm are turned on at the same time. In this case, the voltages applied to the first and second switching devices Qs and Qm may be 0 V. In addition, the current flowing through the first and second switching devices Qs and Qm may be the same as the current flowing through the inductor 40.

A rectified input voltage is applied to the inductor 40 and the current flowing through the inductor 40 is increased.

[Second Operating Mode]

Figure 5:
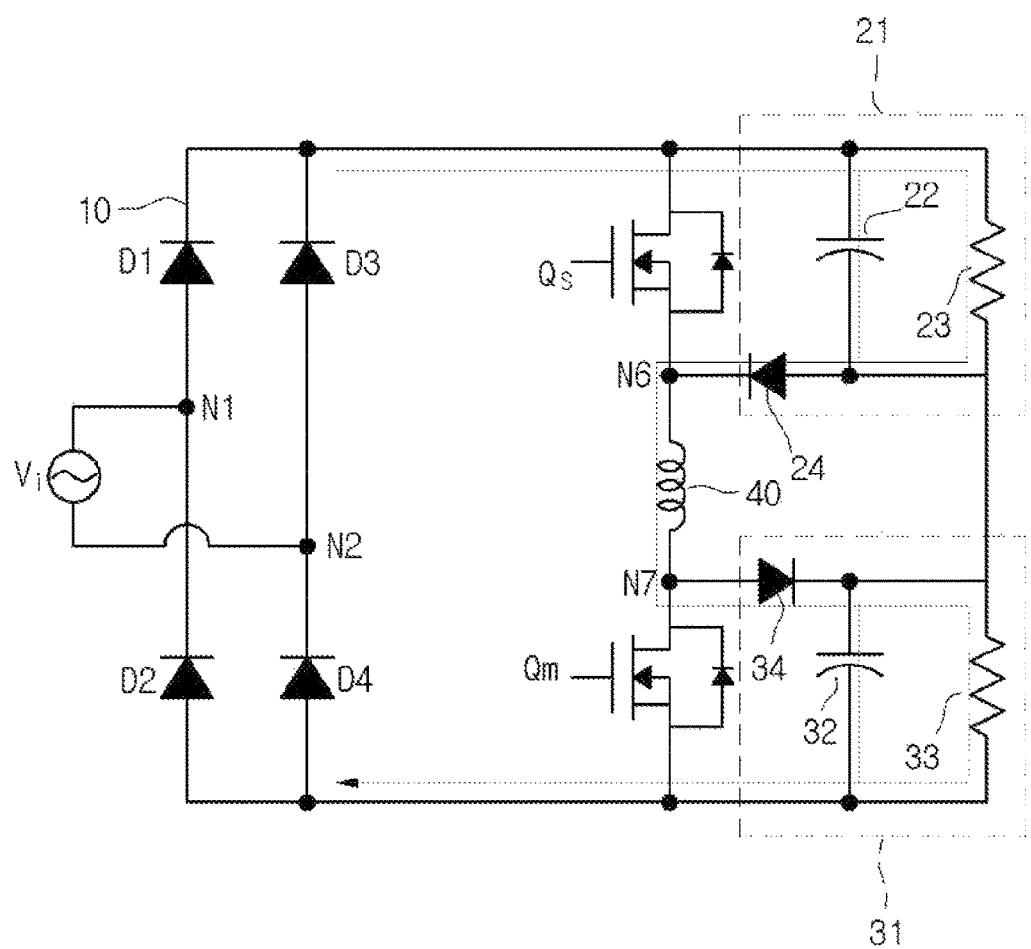
FIG. 5 is a circuit diagram illustrating the operation of the power supply device according to the first embodiment when the first and second switching devices Qs and Qm are turned off.

FIG. 5 is a circuit diagram illustrating the operation of the power supply device 1000 according to the first embodiment when the first and second switching devices Qs and Qm are turned off.

Referring to FIG. 5, in the second operating mode, the first and second switching devices Qs and Qm are turned off at the same time. In this case, the divided voltages of the input voltage are applied to the first and second switching devices Qs and Qm. The current flowing through the first and second switching devices Qs and Qm becomes 0 (zero) A.

Since the first and second output diodes 24 and 34 are turned on, the voltages applied to the first and second output diodes 24 and 34 are 0 V. The current flowing through the first and second output diodes 24 and 34 is the current flowing through the inductor 40.

Since the voltage applied to the inductor 40 is a voltage obtained by subtracting the voltages of the first and second output units 21 and 31 from the input voltage, a negative voltage is applied to the inductor 40. Thus, the current flowing through the inductor 40 is reduced.

Hereinafter, it will be described that the first and second operating modes alternate with each other.

In the first operating mode, the current flowing through the inductor 40 is increased. In this case, when the power supply device 1000 is operated in the second operating mode, the voltage between both terminals of the inductor 40 is increased to maintain the current flowing through the inductor 40. In addition, the current flows through the first and second output units 21 and 31. When the power supply device 1000 switches into the first operating mode again while the current of the inductor 40 is gradually reduced, the first and second switching devices Qs and Qm are turned on so that the current flowing through the inductor 40 is increased.

As described above, when the first and second switching devices are turned on and off at the same time such that the switching between the first and second operating modes is repeated, the on/off ratio of the first and second switching devices Qs and Qm is determined by sensing the output voltages of the first and second output units 21 and 31. In addition, the input voltage may be amplified and the amplified voltage may be equally distributed into the first and second output units 21 and 31.

The voltage transfer ratio of transferring the input voltage to the first and second output units 21 and 31 is expressed as following Equation 3.

$$G_v = \frac{V_{01} + V_{02}}{V_i} = \frac{1}{1 - D} \quad \text{[Equation 3]}$$

In this case, when the duty ratio D is varied in the range of 0 to 1, the voltages of the first and second output units 21 and 31 may be controlled.

As described above, according to the power supply device 1000 of the embodiment, the input voltage is amplified and the amplified voltage is divided to be applied to the first and second output units 21 and 31. Therefore, as well as an IGBT device, an FET device may be used as the switching device.

That is, the restriction of selecting component devices applied to the embodiment is relieved, so that the avoidance design is possible to avoid the increase in the sizes and costs of various kinds of devices.

The voltage stresses of various kinds of devices may be reduced and an output unit is divided into two output units to be driven, so that power may be transferred to circuits of each output unit having mutually different functions, respectively. Thus, the power supply device 1000 according to the embodiment may provide plural power sources by using one power supply source, so that the entire size and cost of a circuit may be reduced.

Although the first and second switching devices Qs and Qm simultaneously turned on and off are described above, the embodiment is not limited thereto.

A product using a power supply device 1000 may require two output units having mutually different voltages. In this case, the first and second switching devices Qs and Qm may be separately operated. That is, PWM signals applied to the first and second switching devices Qs and Qm are separately provided such that the first and second switching devices Qs and Qm may be separately controlled. Thus, mutually different voltages may be output from the first and second output units 21 and 31.

[Third Operating Mode]

Figure 6:
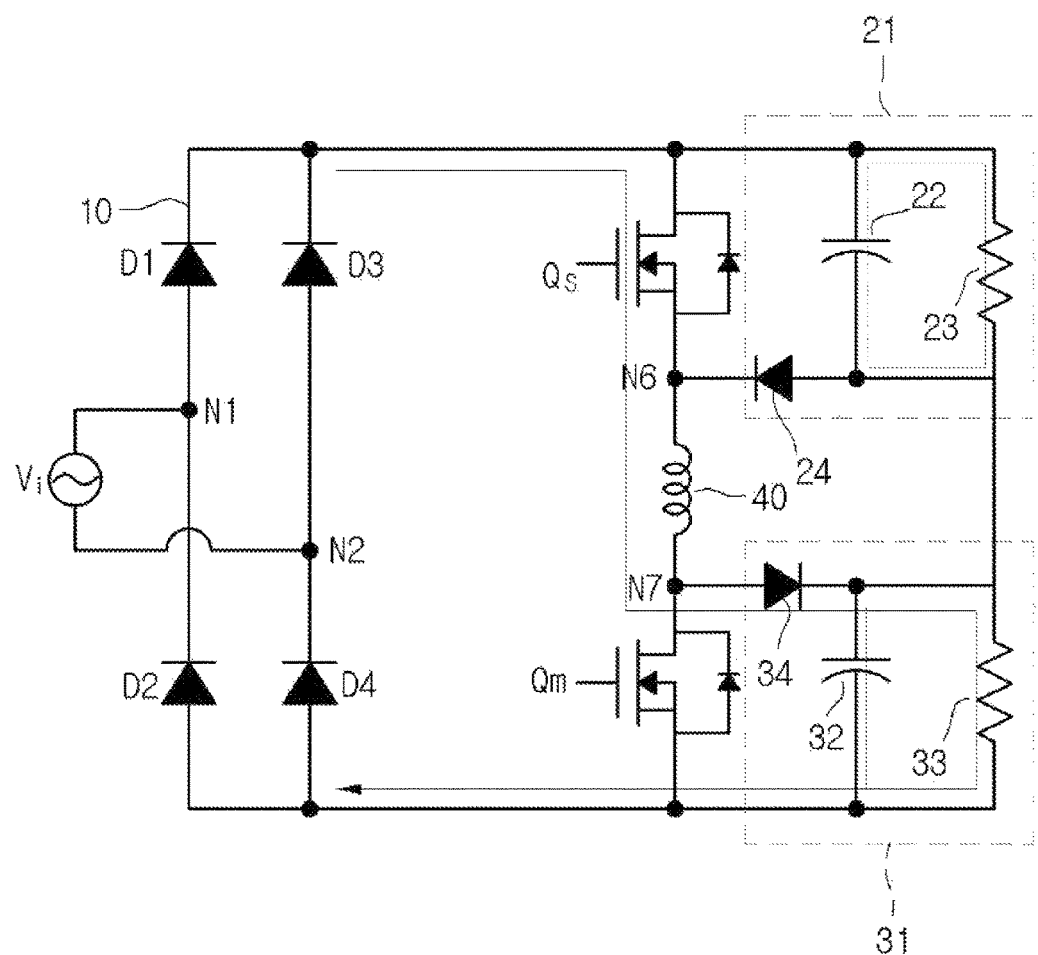
FIG. 6 is a circuit diagram illustrating the operation of the power supply device according to the first embodiment when the first switching device Qs of a power supply device according to the first embodiment is turned on and the second switching device Qm is turned off.

FIG. 6 is a circuit diagram illustrating the operation of the power supply device 1000 according to the first embodiment when the first switching device Qs of a power supply device according to the first embodiment is turned on and the second switching device Qm is turned off.

Referring to FIG. 6, in the third operating mode, the first switching device Qs may be turned on and at the same time, the second switching device Qm may be turned off.

When the first switching device Qs is turned on and the second switching device Qm is turned off, the voltage applied to the first switching device Qs is 0 V and the current flowing through the first switching device Qs is the current flowing through the inductor 40. In addition, the input voltage of the second switching device Qm is amplified so that the current flowing through the second switching device Qm may is 0 A. In addition, a difference voltage between the input voltage and the voltage applied to the second switching device Qm is applied to the inductor 40 so that the difference voltage is negative and the current flowing through the inductor 40 is reduced.

[Fourth Operating Mode]

Figure 7:
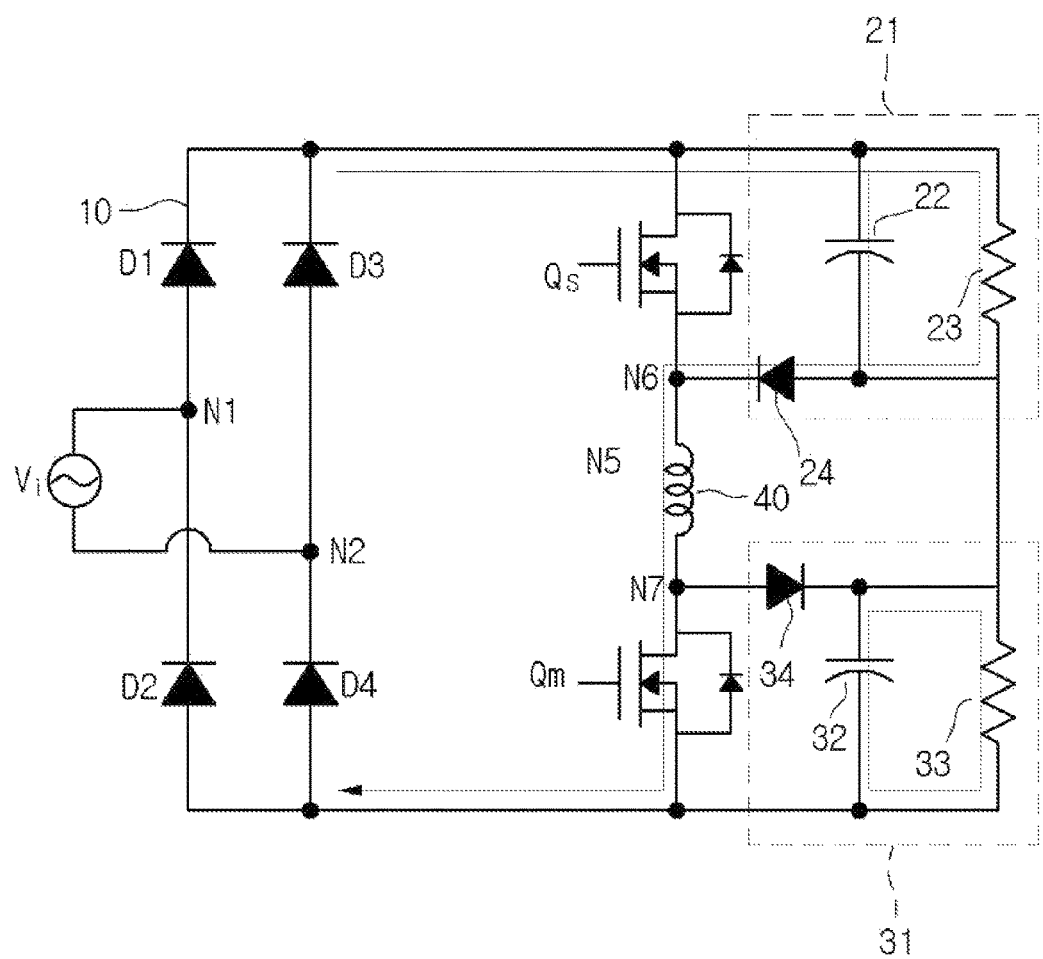

FIG. 7 is a circuit diagram illustrating the operation of the power supply device 1000 according to the first embodiment when the first switching device Qs is turned off and the second switching device Qm is turned on.

Referring to FIG. 6, in the third operating mode, the first switching device Qs may be turned on and at the same time, the second switching device Qm may be turned off.

When the first switching device Qs is turned off and the second switching device Qm is turned on, the amplified input voltage is applied to the first switching device Qs and the current flowing through the first switching device Qs is 0 A. In addition, the voltage applied to the second switching device Qm is 0 V and the current flowing through the second switching device Qm may is the current flowing through the inductor 40. In addition, a difference voltage between the input voltage and the voltage applied to the first switching device Qs is applied to the inductor 40 so that the difference voltage is negative and the current flowing through the inductor 40 is reduced.

In the third and fourth operating modes described above, the amplification of the voltage applied to the first and second output units 21 and 31 may be controlled according to the duty ratio.

In summary, the power supply device 1000 according to the first embodiment may be operated in various manners according to the combinations of the first to fourth operating modes. For example, when the first and second operating modes are used as main operating modes, the amplified voltage is divided by the first and second output units 21 and 31 such that the voltage stress of a semiconductor device may be reduced and the voltages output from the first and second output units 21 and 31 may be utilized for one use or mutually different uses. In addition, when the voltages output from the first and second output units 21 and 31 are intermittently different from each other, the object may be achieved by allowing the duty ratios of the PWM signals applied to the first and second switching devices Qs and Qm to be different from each other. When the first and second operating modes are used as main operating modes, the amplified voltages equal to each other may be applied to the first and second output units 21 and 31. However, due to the unideal characteristics or an external factor of the circuit device, it may be impossible to maintain the application of the amplified voltages equal to each other to the first and second output units 21 and 31. In this case, the amplified voltages equal to each other and applied to the first and second output units 21 and 31 may be maintained while the third and fourth operating modes are added.

Hereinafter, a power supply device 3000 according to the second embodiment will be described.

The second embodiment will be referred to as a balance output power supply device 3000.

According to the power supply device 1000 of the first embodiment described above, the input voltage is divided to be provided to two output units and the input voltage is equally divided in the first to fourth operating modes such that the divided input voltages may be applied to two output units.

To the contrary, the amplified input voltage may be divided into mutually different voltages and the divided voltages may be applied to the two output units. In addition, the input voltage amplified for a predetermined time period is equally distributed to two output units, or divided into mutually different voltages to be supplied to the two output units.

In the second embodiment, a balance output power supply device 1000, which equally divides the input voltage into two voltages to supply the divided voltages to two output ends and controls an unbalance between the input voltages of the output ends, will be described.

When the power supply device 1000 according to the first embodiment is alternately operated in the first or second operating mode, the currents flowing through the loads of the first and second output units 21 and 31 may be different from each other. In this case, the energy charged in the capacitor of one output unit through which greater current flows is relatively less than the energy charged in the capacitor of the other output unit. Thus, the output voltage of the output unit including the capacitor in which relatively small energy is charged may be lowered. In this case, the equal distribution of the input voltage does not occur so that balance outputs are not obtained. While a relative high voltage is applied to one semiconductor device, the voltage stress of the semiconductor device in the circuit to which a high voltage is applied may be increased.

According to the second embodiment, when mutually different currents flow through the first and second output units 21 and 31 so that the output voltages are imbalanced, the imbalance may be corrected.

Hereinafter, an operation of the power supply device 3000 according to the second embodiment will be described with reference to accompanying drawings.

Figure 8:
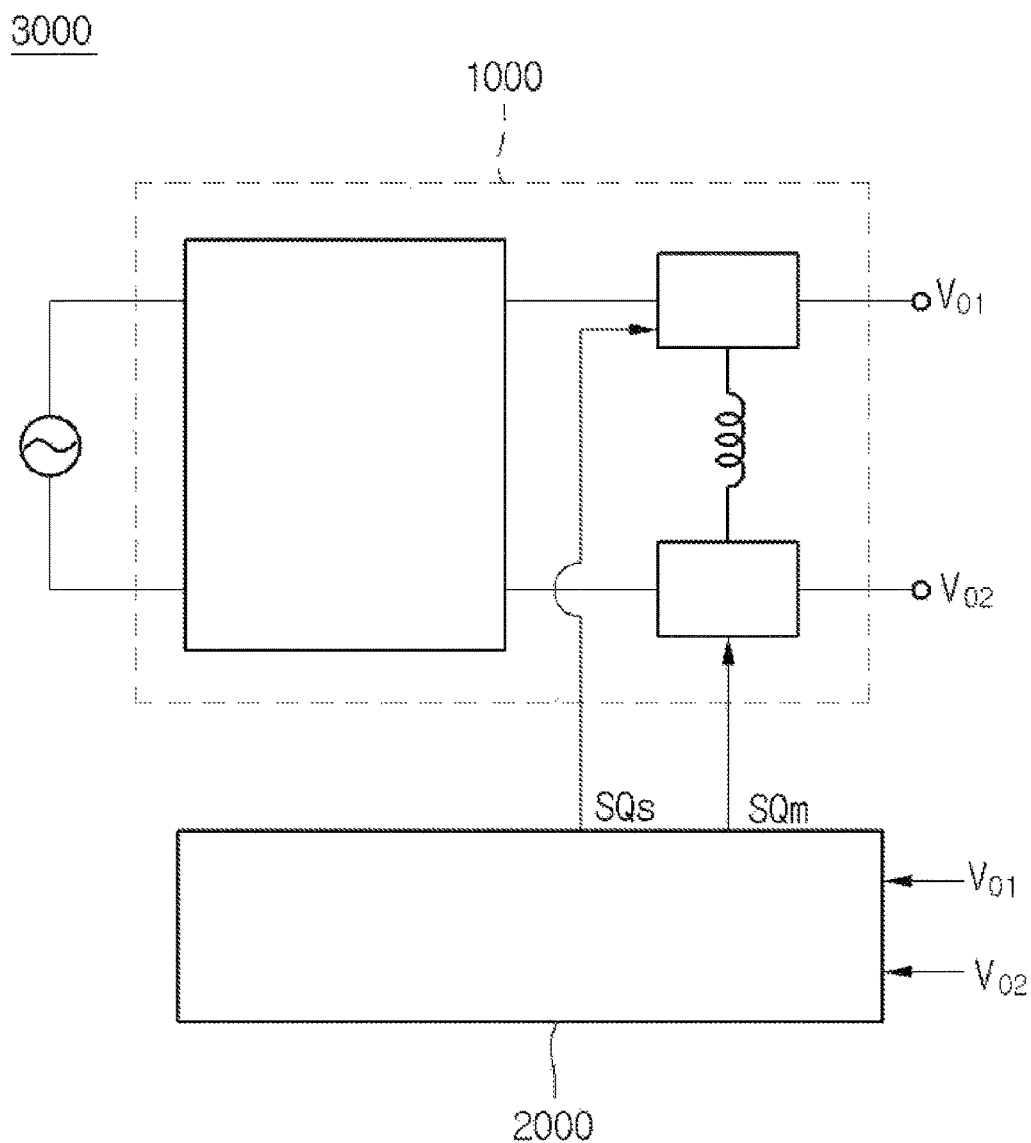
FIG. 8 is a block diagram showing a balance output power supply device according to the second embodiment.
Figure 9:
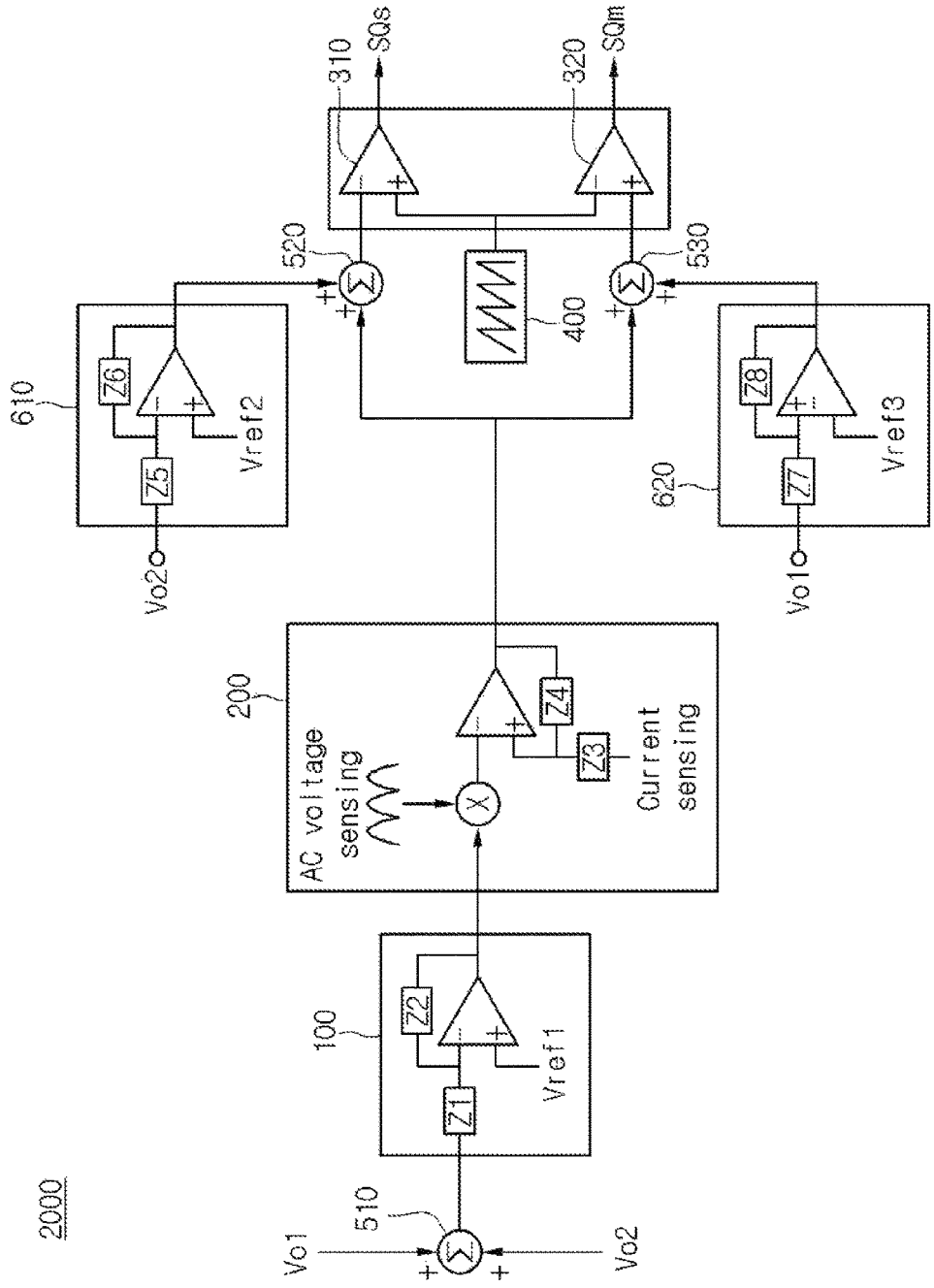
FIG. 9 is a circuit diagram showing a control unit of the balance output power supply device according to the second embodiment.

FIG. 8 is a block diagram showing a balance output power supply device according to the second embodiment. FIG. 9 is a circuit diagram showing a control unit of the balance output power supply device according to the second embodiment.

Referring to FIGS. 8 and 9, the balance output power supply device 3000 may include a power source unit 100 and a control unit 2000.

The power source unit 100 may be the power supply device 1000 described with reference to FIGS. 2 to 7, and the control unit 2000 generates a control signal for allowing switching devices Qs and Qm of the power supply device 1000 to be switched on or off.

Referring to FIGS. 8 and 9, the balance output power supply device 3000 according to the second embodiment may include a voltage controller 100, a power factor correction circuit 200, a triangular wave generation circuit 400, first and second comparators 310 and 320, and first and second fine displacement controllers 610 and 620. In addition, the balance output power supply device 3000 may include first to third adders 510 to 530.

Reviewing the connections between elements constituting the control unit 2000, the first adder 510 may be connected between terminals to which the first and second output voltages Vo1 and Vo2 and an input terminal of a voltage controller 100.

The voltage controller 100 may be connected between a first reference voltage terminal Vref1, an output terminal of the first adder 510 and an input terminal of the power factor correction circuit 200.

The power factor correction circuit 200 may be connected among an output terminal of the voltage controller 100, a sensed input voltage applied terminal, a sensed output current applied terminal and input terminals of the second and third adders 520 and 530. The second adder 520 may be connected to an output terminal of the first fine displacement controller 610 and an input terminal of the first comparator 310. The third adder 530 may be connected to an output terminal of the second fine displacement controller 620 and an input terminal of the second comparator 320. The first fine displacement controller 610 may be connected to a terminal to which the second voltage Vo2 is applied and a terminal to which the second reference voltage Vref2 is applied. The second fine displacement controller 620 may be connected to a terminal to which the first voltage Vo1 is applied and a terminal to which the third reference voltage Vref3 is applied such that a signal is output to the third adder 530.

The first comparator 310 may be connected between an output signal terminal of the triangular wave generation circuit 400, an output signal terminal of the second adder 520 and a control terminal of the first switching device Q3. The second comparator 320 may be connected between the output signal terminal of the triangular wave generation circuit 400, the output signal terminal of the third adder 530 and the control terminal of the second switching device Qm.

Hereinafter, an operation of the balance output power supply device 3000 according to the second embodiment will be described. In this case, as one example, a case that a peak value of the input AC voltage is 400 V and the input AC voltage is amplified twice to output 400 V, respectively will be discussed. The proposed values are only proposed for the purpose of convenient description, but the embodiment is not limited thereto.

The voltage controller 100 compares the addition signal of the output voltages of the first and second output units 21 and 31 with the first reference signal Vref1.

That is, the voltage controller 100 may include an operational amplifier which amplifies the difference between the first reference voltage Vref1 applied to the non-inverting terminal and the output voltage of the first and second output units 21 and 31 to output the first control signal.

The first reference voltage Vref1 may be 800 V generated by amplifying the peak value 400 V of the input AC voltage. The first control signal which is generated by comparing the first reference voltage vref1 and the addition signal of the output voltages of the first and second output units 21 and 31 with each other and amplifying the difference may be output to the power face correction circuit 200.

Meanwhile, the first adder 510 may add the output voltages of the first and second output units 21 and 31 to each other to generate the addition signal.

The power factor correction circuit 200 may receive the first control signal output from the voltage controller 100, the sensed input voltage $V_1$ and the sensed output current and may output a second control signal.

That is, the power factor correction circuit 200 may include an operating amplifier which amplifies the sensed input voltage signal applied to the non-inverting terminal and the difference between the first control signal and the sensed current signal applied to the inverting terminal and outputs the amplified signal as the second control signal.

The sensed output current may be defined as the current flowing through the inductor 400. In addition, the sensed output current may be an average current flowing through the inductor 40 and a current flowing through the first or second switching device Qs or Qm.

The first fine displacement controller 610 may compare the output voltage of the first output unit 21 with the second reference voltage Vref2 to output a first fine displacement signal. The second fine displacement controller 620 may compare the output voltage of the second output unit 31 with the third reference voltage Vref3 to output a second fine displacement signal.

Meanwhile, the first fine displacement controller 610 may include an operational amplifier which receives the output of the second output unit through the non-inverting terminal thereof and the second reference voltage Vref2 through the inverting terminal thereof and amplifies the difference to output the first fine displacement signal. The second fine displacement controller 620 may include an operational amplifier which receives the output of the first output unit through the non-inverting terminal thereof and the third reference voltage Vref3 through the inverting terminal thereof and amplifies the difference to output the second fine displacement signal.

The second and third reference voltages Vref2 and Vref3 may be the same.

When the second and third reference voltages Vref2 and Vref3 may be the voltages of 400 V applied to the first and second output units 21 and 31, where the voltages are generated by amplifying the input voltage and equally applying the amplified voltage to the first and second output units 21 and 1. The voltage 400 V may be used as the second and third reference voltages Vref2 and Vref3.

The addition signal, which is generated from the second adder 520 by adding the second control signal output from the power factor correction circuit 200 to the first fine displacement signal, may be provided to the first comparator 310 as a first comparison signal. The addition signal, which is generated from the third adder 530 by adding the second control signal output from the power factor correction circuit 200 to the second fine displacement signal, may be provided to the second comparator 320 as a second comparison signal.

The first and second comparators 310 and 320, each of which is a circuit for comparing an analog signal with a reference signal to generate a binary signal, are used for converting analog signals into digital signals. The first and second comparators 310 and 320 have the same characteristics as those of a general operating amplifier having a high gain.

The first comparator 310 compares the triangular wave signal output from the triangular wave generation circuit 400 with the first comparison signal to generate a first PWM signal and provides the first PWM signal to the first switching device Qs to control the turn-on/off of the first switching device Qs. The second comparator 320 compares the triangular wave signal output from the triangular wave generation circuit 400 with the second comparison signal to generate a second PWM signal and provides the second PWM signal to the second switching device Qm to control the turn-on/off of the second switching device Qm.

In detail, the operating amplifier of the first comparator 310 receives the first fine displacement signal and the second control signal through the non-inverting terminal thereof and the triangular wave signal through the inverting terminal thereof and compares two signals with each other to output the first PWM signal. The operating amplifier of the second comparator 320 receives the second fine displacement signal and the second control signal through the non-inverting terminal thereof and the triangular wave signal through the inverting terminal thereof and compares two signals with each other to output the second PWM signal.

The first and second PWM signals are signals for controlling the on/off times of the first and second switching devices. That is, the first and second switching devices may be linearly controlled by controlling the duty ratios of the first and second PWM signals in the range of 1% to 100%.

Meanwhile, the triangular wave signal generated from the triangular wave generation circuit 400 may be set to have a period and an amplitude, such that a pulse width modulation duty ratio is controlled according to the second control signal and the first and second fine displacement signals.

Meanwhile, first to eighth impedances Z1 to Z8 included in the voltage control unit 100, the power factor correction circuit 200, and the first and second fine displacement controllers 610 and 620 may include a resistance device and a capacitive device. Specifically, the first, third, fifth and seventh impedances Z1, Z3, Z5 and Z7 may be resistors and the second, fourth, sixth and eighth impedances Z2, Z4, Z6 and Z8 each may include a resistor and a capacitor connected in series to the resistor which constitute a negative feedback of an operating amplifier.

An operation of controlling an unbalance to be a balance output will be described with reference to FIGS. 4 to 7.

For example, the amplifying unit 50 which amplifies the input voltage from the input power source unit 11 n times will be discussed.

The first amplifying unit 20 included in the amplifying unit 50 outputs the first output voltage Vo1 corresponding to n1 (n1 is a positive real number) times of the input voltage and the second amplifying unit 30 outputs the second output voltage Vo2 corresponding to n2 (n2 is a positive real number) times of the input voltage.

In this case, when the output voltage of the second output unit 31 included in the second amplifying unit 30 is reduced so that n1 is greater than n2, that is, n1>n2, the on-time of the first switching device Qs of the first output unit 21 is increased, that is, the turn-off time point of the first switching device Qs follows the turn-off time point of the second switching device Qm, so that the output voltages of the first and second output units 21 and 31 may be controlled to be balanced with each other.

That is, as shown in FIGS. 4 and 5, when the power supply device 1000 alternates between the first and second operating modes and the output voltage of the second output unit 31 is reduced due to the unideal characteristics or an external factor of the internal device of the circuit, the power supply device 1000 temporarily switches into the third operating mode as shown in FIG. 6, such that the output voltages of the first and second output units 21 and 31 may be controlled.

Hereinafter, when the output voltages of the first and second output units 21 and 31 are imbalanced, the operation of the control unit will be discussed.

As an example, when the output voltage of the second output unit 31 is reduced, the voltage applied to the inverting terminal of the first fine displacement control unit 610 is reduced. Thus, the voltage of the first fine displacement signal, which is the output voltage of the first fine displacement control unit 610, may be increased (high level signal) and output. When the output voltage of the second output unit 31 is reduced, the output voltage of the first output unit 21 is increased and the voltage applied to the inverting terminal of the second fine displacement control unit 620 is increased. Thus, the voltage of the second fine displacement signal, which is the output voltage of the second fine displacement control unit 620, may be increased (low level signal).

As described above, the first fine displacement signal having an increased voltage and the second fine displacement signal having a reduced voltage may be converted into the first and second comparison signals by adding the second control signal to the first and second fine displacement signals, respectively, and the first and second comparison signals may be applied to the first and second comparators 310 and 320, respectively.

The first and second comparators 310 and 320 may compare the first and second comparison signal applied to them with the triangular wave signal to generate and output the PWM output signal, the pulse width of which is changed.

In detail, the amplitude of the signal applied to the inverting terminal of the first comparator 310 is increased by the first fine displacement signal having a high level, so that the duty ratio of the first PWM output signal may be increased. In addition, the amplitude of the signal applied to the inverting terminal of the second comparator 320 is reduced by the second fine displacement signal having a low level, so that the duty ratio of the second PWM output signal may be reduced.

The turn-on time of the first switching device Qs may be lengthened by the first PWM output signal having the increased duty ratio and the turn-on time of the second switching device Qm may be shortened. That is, while being turned on at the same time point, the first and second switching devices Qs and Qm may be turned off at mutually different time points, so that the voltages of the first and second output units 21 and 31 may be controlled to be balanced with each other.

Meanwhile, when the signals applied to the first and second comparators 310 and 320 are inverted to apply the first and second comparison signals to the inverting terminals and the triangular wave signal is applied to the non-inverting terminals, the first and second comparators 310 and 320 are oppositely operated, so that the first comparator 310 may generate the first PWM output signal having a reduced duty ratio and the second comparator 320 may generate the second PWM output signal having an increased duty ratio.

In addition, when the bandwidths of the voltage controller 100, the power factor correction circuit 200 and the first and second fine displacement controllers 610 and 620 are chosen, it is preferable that the power factor correction circuit 200 has the first widest bandwidth and the voltage controller 100 has the second widest bandwidth.

The control unit 2000 of the balance output power supply device 1000 according to the second embodiment has been described above with the digital controller, but differently from it, the control unit 2000 may be implemented by using a PFC IC ((Power Factor Controller Integrated Circuit).

Figure 10:
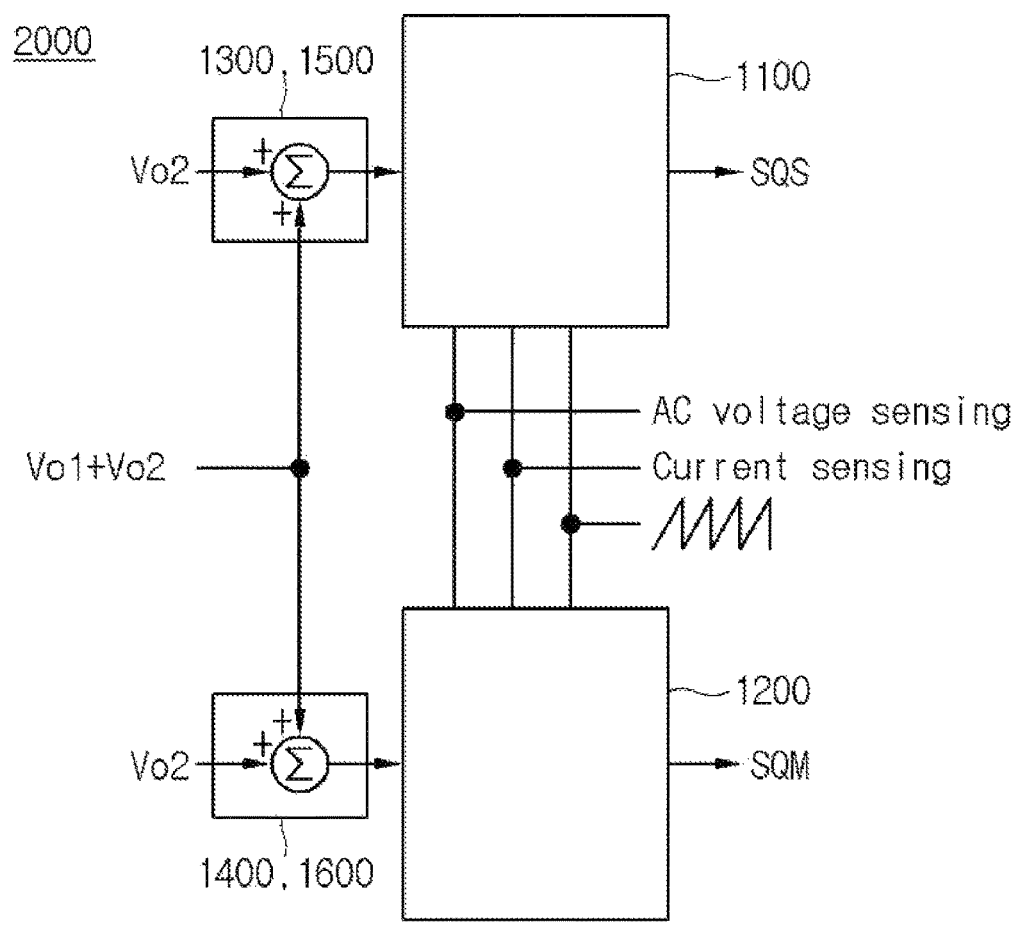
FIG. 10 is a circuit diagram showing an analog control unit of the balance output power supply device according to the second embodiment

FIG. 10 is a circuit diagram showing an analog control unit 2000 of the balance output power supply device 3000 according to the second embodiment.

Referring to FIG. 10, the control unit 2000 of the balance output supply device 3000 according to the second embodiment may include first and second PFC ICs 1100 and 1200, and first and second adders 1300 and 1400.

The first and second PFC ICs 1100 and 1200 may receive the sensed AC input voltage, the sensed current, the triangular wave and feedback signals form the first and second adders 1300 and 1400 and output the first and second PWM signals for controlling the first and second switching devices Qs and Qm.

The first adder 1300 may add the output voltage of the second output unit 31 to the input voltages of the first and second output units 21 and 31 and output it the first PFC IC 1100. The second adder 1400 may add the output voltage of the first output unit 21 to the input voltages of the first and second output units 21 and 31 and output it the second PFC IC 1200.

The first and second dual feedback units 1500 and 1600 may be implemented by using a device of 431 series having a function of feed-backing an output voltage instead of the first and second adders 1300 and 1400.

Figure 11:
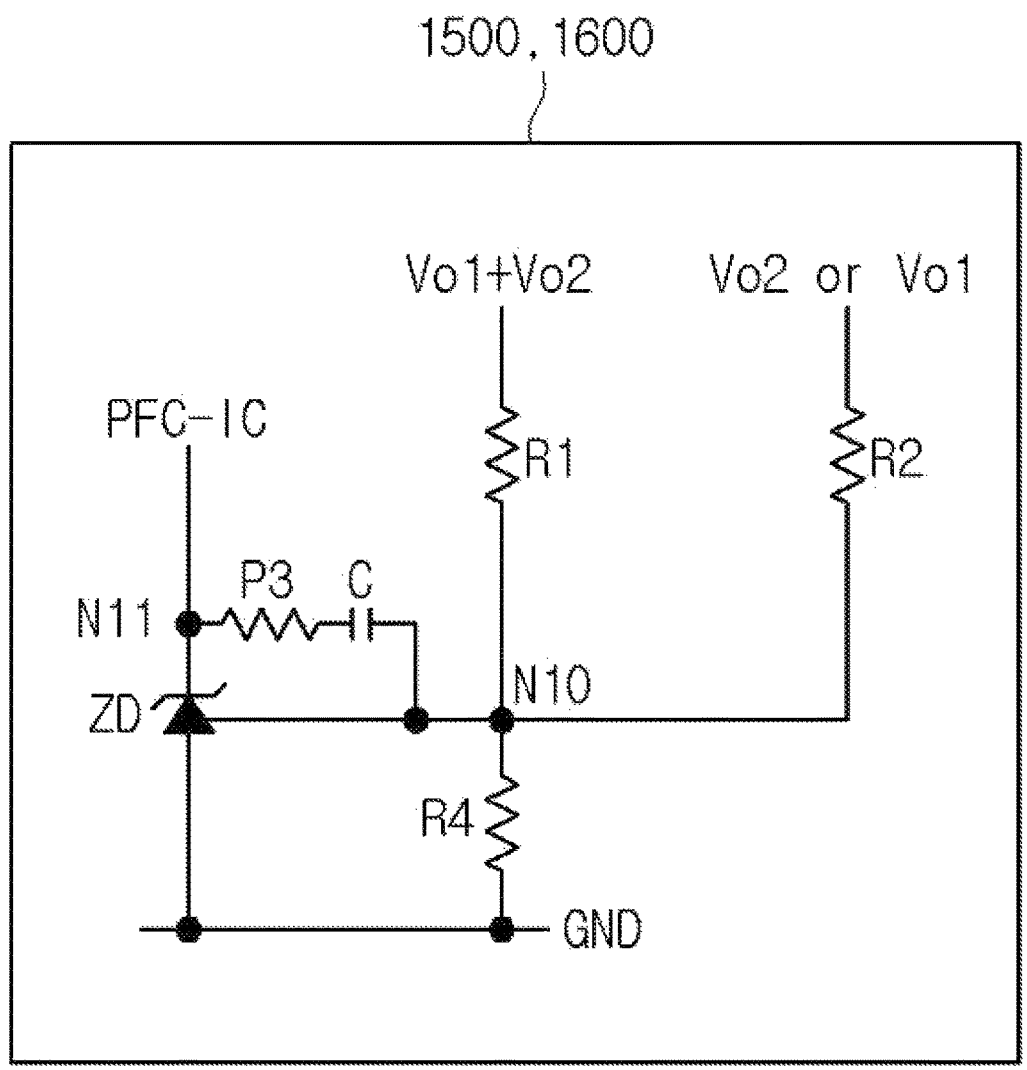
FIG. 11 is a circuit diagram showing the first and second dual feedback units.

FIG. 11 is a circuit diagram showing the first and second dual feedback units.

Referring to FIG. 11, detailed circuits of the first and second dual feedback units 1500 and 1600 will be overviewed.

Since the first and second dual feedback units 1500 and 1600 each having an output voltage feedback structure may be the same, the following description will be mainly focused on the first dual feedback unit 1500.

The first dual feedback unit 1500 may include first to fourth resistors R1 to R4, a capacitor C and a zener diode ZD.

The first resistor R1 is connected between the tenth node N10 and a terminal to which the output voltages of the first and second output units 21 and 31 are applied.

The second resistor R2 is connected between the eighth node N8 and a terminal to which the output voltage of the second output unit 31 is applied.

The third resistor R3 and the capacitor C, which are connected in series to each other, are connected between the tenth and eleventh nodes N8 and N11.

The zener diode ZD is connected between the tenth node N10, the eleventh node N11 and a ground.

A resistor having resistance less than that of the second resistor R2 may be selected as the first resistor R1, so that a weight of the first resistor R1 may be reduced.

Figure 12:
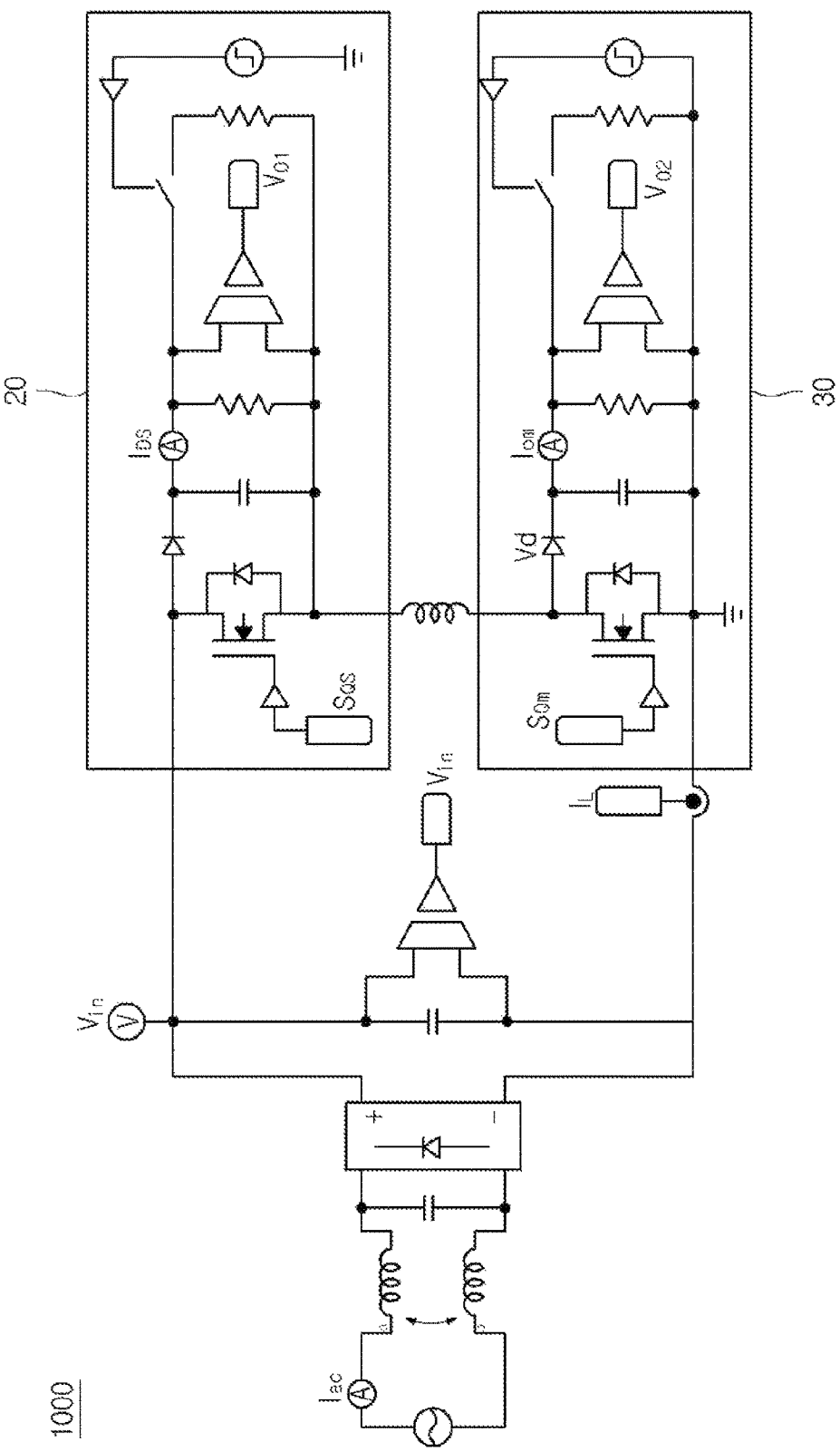
FIGS. 12 and 13 are circuit diagrams showing a power supply device and a control unit for driving the power supply device according to an embodiment.
Figure 13:
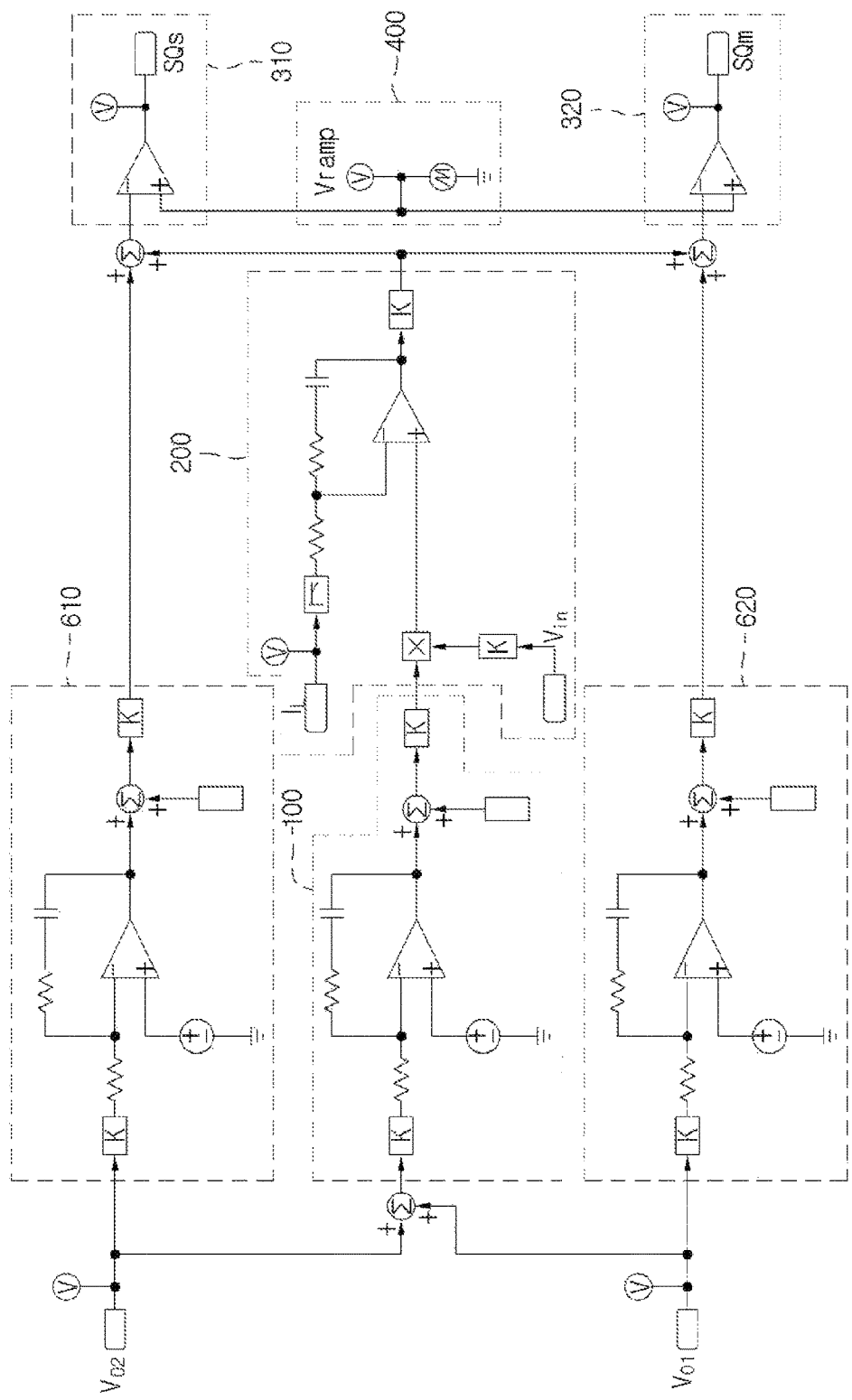

FIGS. 12 and 13 show circuits for simulating a balance output power supply device 3000 according to an embodiment.

Figure 14:
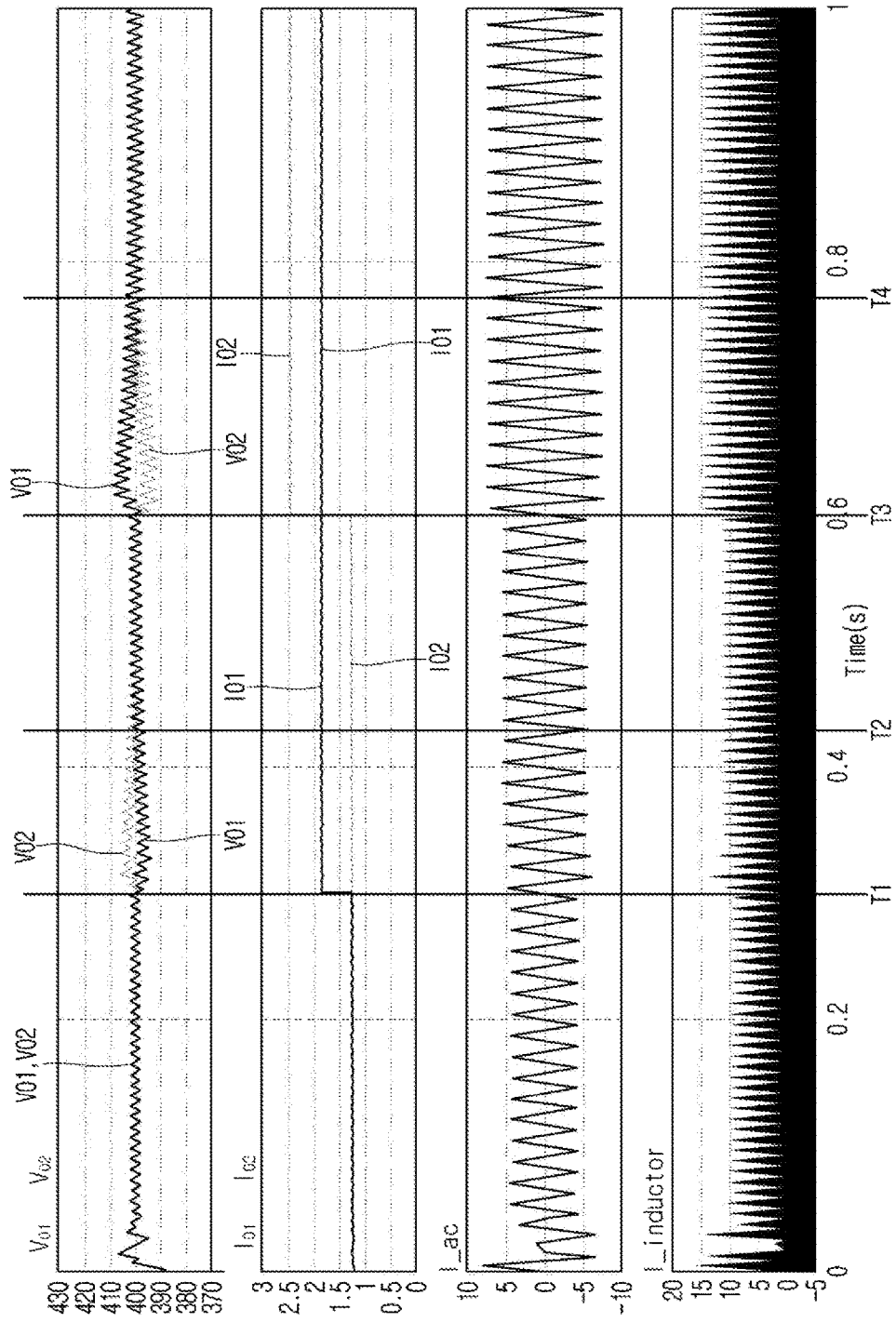
FIG. 14 illustrates the simulation result of the balance output power supply device of FIGS. 12 and 13.

The operation and effect of the balance output power supply device 2000 according to the second embodiment will be described with reference to FIG. 14 illustrating the simulation result of the balance output power supply device 300 of FIGS. 12 and 13.

Referring to FIG. 14, it is understood that, when the current flowing through the first output unit 21 at time point T1 is increased so that the currents flowing through the first and second output units 21 and 31 are imbalanced with each other, the voltage Vo2 of the second output unit 31 is increased and the voltage Vo1 of the first output unit 21 is reduced. In this case, the first fine displacement signal having a high level may be output from the first fine displacement control unit 610 so that the amplitude of the signal applied to the inverting terminal of the first comparator 310 is increased, thereby increasing the duty ratio of the first PWM output signal. In addition, it may be confirmed that the amplitude of the signal applied to the inverting terminal of the second comparator 320 by the second fine displacement signal having a low level and output from the second fine displacement control unit 620 is increased, so that the output voltages Vo1 and Vo2 of the first and second output units 21 and 31 are balanced with each other after time point T2 while the duty radio of the second PWM output signal is reduced.

To the contrary, it is understood that, when the current flowing through the second output unit 31 at time point T3 is increased to imbalance the currents flowing through the first and second output units 21 and 31 with each other, the voltage Vo1 of the first output unit 21 is increased and the voltage Vo2 of the second output unit 31 is reduced. In this case, the first fine displacement signal having a low level may be output from the first fine displacement control unit 610 so that the amplitude of the signal applied to the inverting terminal of the first comparator 310 is reduced, thereby reducing the duty ratio of the first PWM output signal. In addition, it may be confirmed that the amplitude of the signal applied to the inverting terminal of the second comparator 320 by the second fine displacement signal having a high level and output from the second fine displacement control unit 620 is increased, so that the output voltages Vo1 and Vo2 of the first and second output units 21 and 31 are balanced with each other after time point T4 while the duty radio of the second PWM output signal is increased.

According to the balance output power supply device 1000 of the embodiment, as described above, when the output voltages of the first and second output units 21 and 31 are imbalanced with each other, the output voltages of the first and second output units 21 and 31 are balanced with each other while the duty ratios of the first and second PWM signals are controlled according to the operations of the first and second fine displacement control units 610 and 620 and the first and second comparators 310 and 320.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The power supply device according to the embodiment may be applicable to a power field.

The invention claimed is:
1. A power supply device comprising:
an input power source unit to rectify AC power to output a first voltage;
an amplifying unit to amplify the first voltage received from the input power source unit and divide the amplified voltage into second and third voltages; and
a control unit to control the amplifying unit such that the second and third voltages have values equal to each other,
wherein the amplifying unit includes an inductor, and first and second amplifying units connected to both terminals of the inductor, wherein the second voltage is output from the first amplifying unit, and the third voltage is output from the second amplifying unit, wherein the first amplifying unit outputs the second voltage according to an operation of a first switching device, and the second amplifying unit outputs the third voltage according to an operation of a second switching device, and wherein the control unit includes a voltage controller which compares output signals of the first and second amplifying units with a first reference voltage to output a first control signal.

2. The power supply device of claim 1, wherein the control unit further includes a power factor improving circuit unit which receives the first control signal and outputs a compensation value to control a phase difference between a voltage and a current of the input power source unit.

3. The power supply device of claim 2, wherein the power factor improving circuit unit is controlled according to the first control signal, the first voltage and a current flowing through the inductor.

4. The power supply device of claim 2, wherein the control unit further includes a fine displacement control unit which compares the second and third voltages with second and third reference voltages, respectively, and outputs a fine displacement signal.

5. The power supply device of claim 4, further comprising a comparator to compare a compensation value of the power factor circuit unit, the fine displacement signal and a triangular wave signal with one another to control the first and second switching devices.

6. The power supply device of claim 5, wherein the fine displacement control unit includes first and second fine displacement control units, the first fine displacement control unit compares the second voltage of the first amplifying unit with the second reference voltage to output a first fine displacement signal, and the second fine displacement control unit compares the third voltage of the second amplifying unit with the third reference voltage to output a second fine displacement signal.

7. The power supply device of claim 6, wherein the comparator includes first and second comparators, the first comparator compares a first comparison signal, which is a sum of the compensation value of the power factor circuit unit and the first fine displacement signal, with the triangular wave signal to output a first PWM signal, and the second comparator compares a second comparison signal, which is a sum of the compensation value of the power factor circuit unit and the second fine displacement signal, with the triangular wave signal to output a second PWM signal.

8. The power supply device of claim 7, wherein the first PWM signal controls the first switching device, and the second PWM signal controls the second switching device.

9. The power supply device of claim 8, wherein the first comparison signal is applied to an non-inverting terminal of the first comparator, the triangular wave signal is applied to an inverting terminal of the first comparator, the second comparison signal is applied to an non-inverting terminal of the second comparator, and the triangular wave signal is applied to an inverting terminal of the second comparator.

10. The power supply device of claim 6, wherein the first and second fine displacement control units are configured as an operating amplifier.

11. The power supply device of claim 10, wherein the first and second fine displacement control units include a negative feedback having a resistor and a capacitor connected in series with the resistor.

12. The power supply device of claim 5, wherein the second reference voltage has a value equal to a value of the third reference voltage.

13. The power supply device of claim 5, wherein a sum of the second and third reference voltages is equal to the first reference voltage.

14. A power supply device comprising:

an input power source unit to rectify AC power to output a first voltage;

an amplifying unit to amplify the first voltage received from the input power source unit and divide the amplified voltage into second and third voltages;

a control unit to control the amplifying unit such that the second and third voltages have values equal to each other;

a rectifier to rectify AC power to output a first voltage;

a first amplifying unit to amplify the first voltage to output a second voltage;

a second amplifying unit to amplify the first voltage to output a third voltage;

an inductor connected in series between the first and second amplifiers; and a control unit to control the first and second amplifying units to maintain the second and third voltages to be equal to each other, wherein:

the first amplifying unit includes a first switching device and a first output unit connected in parallel to the first switching device, the second amplifying unit includes a second switching device and a second output unit connected in parallel to the second switching device, the control unit controls the first and second switching devices to be operated in first and second operating modes, the first and second switching devices are simultaneously turned on and off in the first operating mode, and the first switching device is turned off at a first time point and the second switching device is turned off at a second time point in the second operating mode.

15. The power supply device of claim 14, wherein the control unit controls the first and second switching devices to be operated in the second operating mode when the second and third voltages are different from each other.

16. The power supply device of claim 15, wherein the first time point follows the second time point.

* * * * *